United States Patent [19]

Raquet et al.

[11] 4,203,546
[45] May 20, 1980

[54] OSCILLATION DAMPENING SYSTEM FOR A RAILWAY TRACK

[75] Inventors: Erwin Raquet, Witten; Gerhard Tacke, Bochum; Wilhelm Heller, Duisburg, all of Fed. Rep. of Germany

[73] Assignee: Fried. Krupp Hüttenwerke AG, Bochum, Fed. Rep. of Germany

[21] Appl. No.: 862,331

[22] Filed: Dec. 20, 1977

[30] Foreign Application Priority Data

Dec. 21, 1976 [DE] Fed. Rep. of Germany ....... 2657860

[51] Int. Cl.² ...................... E01B 26/00; E01B 19/00; H02G 7/14
[52] U.S. Cl. .......................................... 238/1; 174/42; 188/1 B; 238/122; 238/149; 238/382; 248/559
[58] Field of Search ................... 238/1, 283, 284, 302, 238/382, 122, 149, 150; 248/15, 18, 20, 21, 358 R, 559; 188/1 B; 174/42

[56] References Cited

U.S. PATENT DOCUMENTS

| 811,535 | 2/1906 | Anderson | 238/382 |
| 3,088,062 | 4/1963 | Hudimac | 188/1 B X |
| 3,321,569 | 5/1967 | Taylor | 188/1 B X |
| 3,388,772 | 6/1968 | Marsh et al. | 188/1 B |
| 3,392,953 | 7/1968 | Ciringione et al. | 188/1 B X |
| 3,447,638 | 6/1969 | Schilberg | 188/1 B |
| 3,525,472 | 8/1970 | Sato | 238/382 X |
| 4,047,663 | 9/1977 | Reynolds et al. | 238/283 X |

FOREIGN PATENT DOCUMENTS

| 321783 | 5/1957 | Switzerland | 238/382 |
| 685503 | 1/1953 | United Kingdom | 188/1 B |

*Primary Examiner*—Randolph A. Reese
*Attorney, Agent, or Firm*—J. Harold Nissen

[57] ABSTRACT

An oscillation dampening system composed of masses, in which a spring and dampeners are clamped together and coupled to a railroad track to prevent the formation of ripples on the track. The system is tuned to the characteristic frequency of the railroad track and is coupled thereto to reduce the maximum amplitude of oscillation at the characteristic frequency and to shift the occurrence of other amplitudes of oscillation to frequencies away from the characteristic frequency and to reduce the amplitudes of oscillation at the shifted frequency. The maximum of the shifted amplitudes of oscillation is reduced by ten percent from the maximum at the characteristic frequency.

19 Claims, 5 Drawing Figures

OSCILLATION DAMPENING SYSTEM FOR A RAILWAY TRACK

BACKGROUND OF THE INVENTION

This invention relates to an oscillation dampening system for railway tracks.

More particularly, the invention relates to a track for rail vehicles in which each rail is secured onto a foundation by means of spaced rail sleepers or ties. Each rail is incited to oscillate by the wheel of the railway vehicles running thereover, and additional masses are provided which are attached to the rail to dampen these oscillations.

In the normal usage of railway tracks, ripples are produced in the tracks. These ripples are produced as a result of a vertical oscillation or alternating upward and downward slopes which arise on the running or travelling surface of the rail in a longitudinal direction of the rail. A wheel which travels or moves over a rail with ripples produces a noise. This noise increases with the speed of the wheel and the noise which is produced is greatly increased when compared with the noise made by a wheel running over a rail which is free from ripples. Not only is the noise a problem today because of environmental conditions and the desire to reduce the noise for reasons of environmental protection, but the noise problem has existed for many decades, and scientists have been occupied with the problem of the appearance and removal of ripples for a long time. In addition to the noise factor, the rail sub-structure and the rail securing elements are greatly stressed and may even be damaged as a result of the shaking caused by running wheels on rails with ripples. Corresponding dangers exist for the vehicle running over such a rail with ripples. Without being able to explain in detail the mechanism which causes the appearance of ripples, specialists have previously generally assumed that the formation of ripples is connected with the oscillations of the wheel of a railway vehicle or the rail/wheel system.

A number of proposals have been made to remove the ripples as well as to reduce the ripples. Some of these proposals have been carried out and others have not. Thus, it was proposed (Eisenbahningenieur 27 (1976), 5, pages 200-207) either to use a particular alloy for the rail material or to arrange the rail on a less elastic superstructure, or to follow both proposals. It was further proposed to take special steps in connection with the wheel or with the wheelset, e.g. to provide for the reduction of the unsprung wheelset mass. A further proposal (German Pat. No. 966,656, Swiss Pat. No. 321,783) was to provide cross-sectional alterations distributed at unequal distances over the length of the rail, e.g. in the form of thickening (such as, additional masses), to dampen the characteristic oscillations of the rail. None of these proposals have up to the present time led to a satisfactory result. It is still necessary to grind off the ripples on the surface of the rail from time to time.

SUMMARY OF THE INVENTION

It is therefore an object of the invention to provide a track for rail vehicles in which no ripples form on the running surface of the rail.

The present invention proposes to accomplish the aforesaid object by including the masses as parts of an oscillation system. The oscillation system according to the invention includes interrelated masses, springs and dampeners to provide the required dampening of the characteristic oscillations of the rail. This dampening is coordinated with the characteristic frequency of the rail, and the oscillation system is coupled to the rail.

The oscillations are reduced in all directions with the features of the aforesaid oscillation system, and the oscillation system acts as a resonance absorber. Therefore, not only the vertical oscillations which are responsible for the ripple formation, but the horizontal and torsional oscillations which are particularly responsible for the sound radiation are also reduced.

The oscillating system is preferably tuned to the characteristic frequency of the rail at the maximum of amplitude of the vertical oscillations. In the case of this step, the invention operates from the knowledge that the rail system is incited or induced to oscillation in a wide band due to the wheel running over the rail, so that the rail has a distinct maximum for the vertical oscillations amplitudes in a specific frequency zone. Dependent on the rail profile (e.g. page 49 of UIC-60) and the distance between the spaced sleepers (approx. 0.6 m), the maximum is in the range of about 900 to 1200 Hz. Comparative measurements of oscillations on rails both with and without the oscillating system according to the invention provides the following results.

With a UIC-60 rail on sleepers placed onto a bed of broken stones, the distinct maximum of the vertical oscillations was 1130 Hz. A railway vehicle was run over the rail at a speed of 160 km/hr. In the situation when the rail had a ripple-free rail running surface, the amplitude of vertical oscillations amounted to a maximum of 0.01 mm, and an acceleration of the vehicle of about 50 g was achieved. As a consequence of the ripples forming in operation or during use, the amplitude and the forces due to acceleration between the rails and the railway vehicle wheels running thereover, all increase to about ten times the aforesaid value.

When a track is provided with the oscillating system according to the invention, the distinct maximum of the amplitudes of the vertical oscillations was suppressed. The new smaller secondary maxima did occur, and the values of these secondary maxima were smaller by about a factor of 10 below the value of the first individual maximum.

This reduction in the maximum values of vertical oscillations clearly indicates that the forces applied to the rails to impart oscillations are reduced. The interacting forces imparted by the rail wheels to the tracks, as well as the load of the railway vehicle imparted to the tracks through the wheels of the vehicle, are reduced. Either a mathematical calculation or experimental tests can be performed to determine the individual amount of mass, spring rigidity and dampening of the oscillation system.

A further reduction in the load can be achieved if the oscillating system has a characteristic frequency such that the secondary maxima which arise are maintained below the frequencies at which the inciting forces are at their maximum, and preferably at frequencies at which the inciting forces are at their maximum.

There are various possibilities for carrying out the full oscillating system. According to a first embodiment, the full oscillating system is composed of a plurality of the individual oscillating systems. These individual systems are spaced from one another along the length of the rail, and in particular they can be placed between the sleepers and/or in the area of the sleepers. But, it is also possible to provide for a single full oscillating system which extends continuously in longitudinal direction along the rail and is coextensive therewith.

With respect to the position or placement of the mass onto the rail, there are various possibilities. In a first embodiment the mass is arranged below the rail foot; and, in a second embodiment the mass can be placed at the rail stem, and in particular the mass can be divided up and placed onto both sides of the rail stem.

The mass can be coupled to the rail by means of a saucer spring. When the mass is coupled by means of the spring saucer, it is secured below the rail foot. If the mass is arranged at the stem, it is preferably secured thereto by means of a transverse beam spring.

A suitable material for dampening the spring is a material having inner friction. For example, the oscillating system could be embedded in oil. Rubber under initial stress has also proved to be suitable, and the spring can be arranged between rubber.

The oscillating system has a characteristic frequency so that secondary maxima arise which are outside the range of the frequencies at which the inciting forces are at their maximum, and are preferably at frequencies at which the inciting forces are at their minimum.

In order that the invention may be more clearly understood and readily carried into effect, the same will now be described with reference to the accompanying drawings.

DESCRIPTION OF THE PREFERRED EMBODIMENTS

Figure 2:
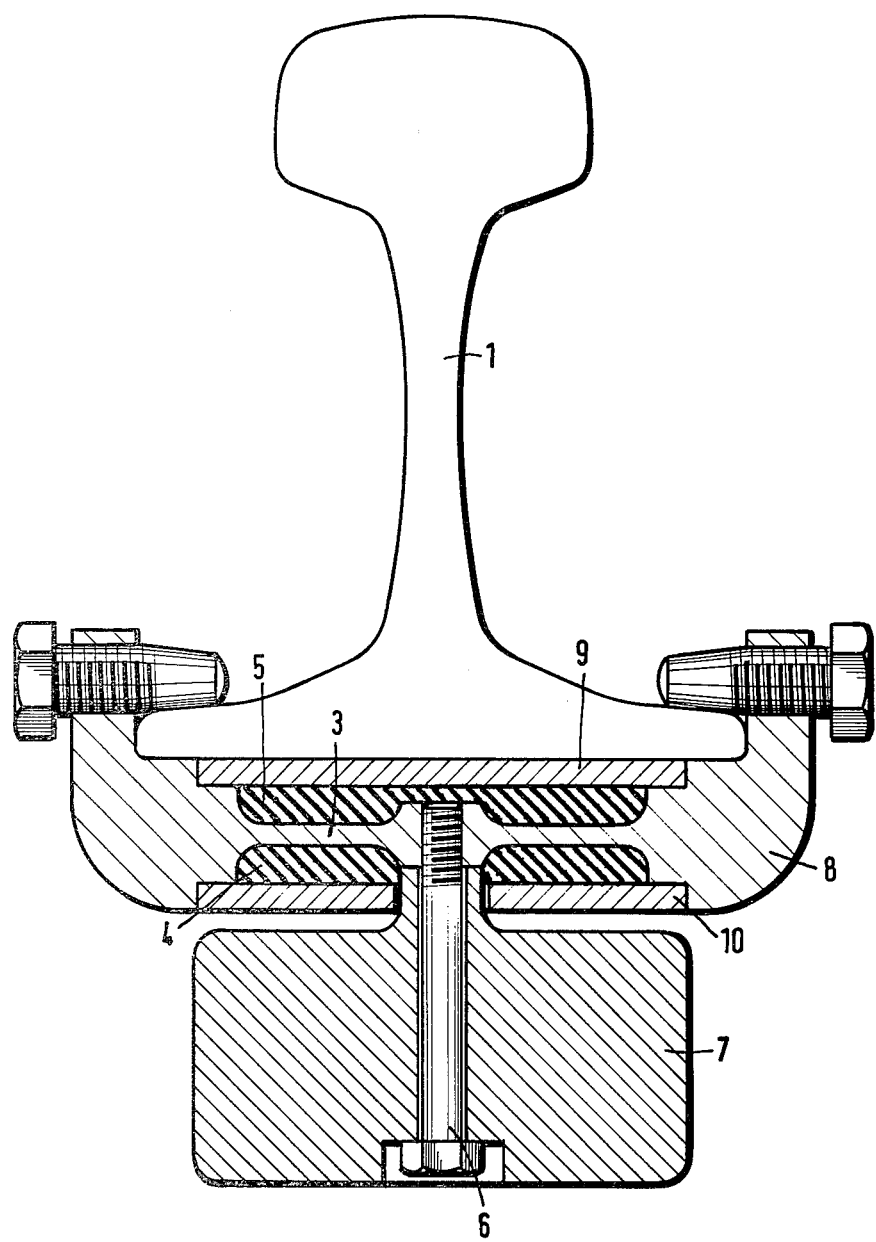
FIG. 2 is a vertical sectional view of a rail with an oscillation system according to one embodiment of the invention. The oscillation system is arranged below the rail foot and between the sleepers.
Figure 3:
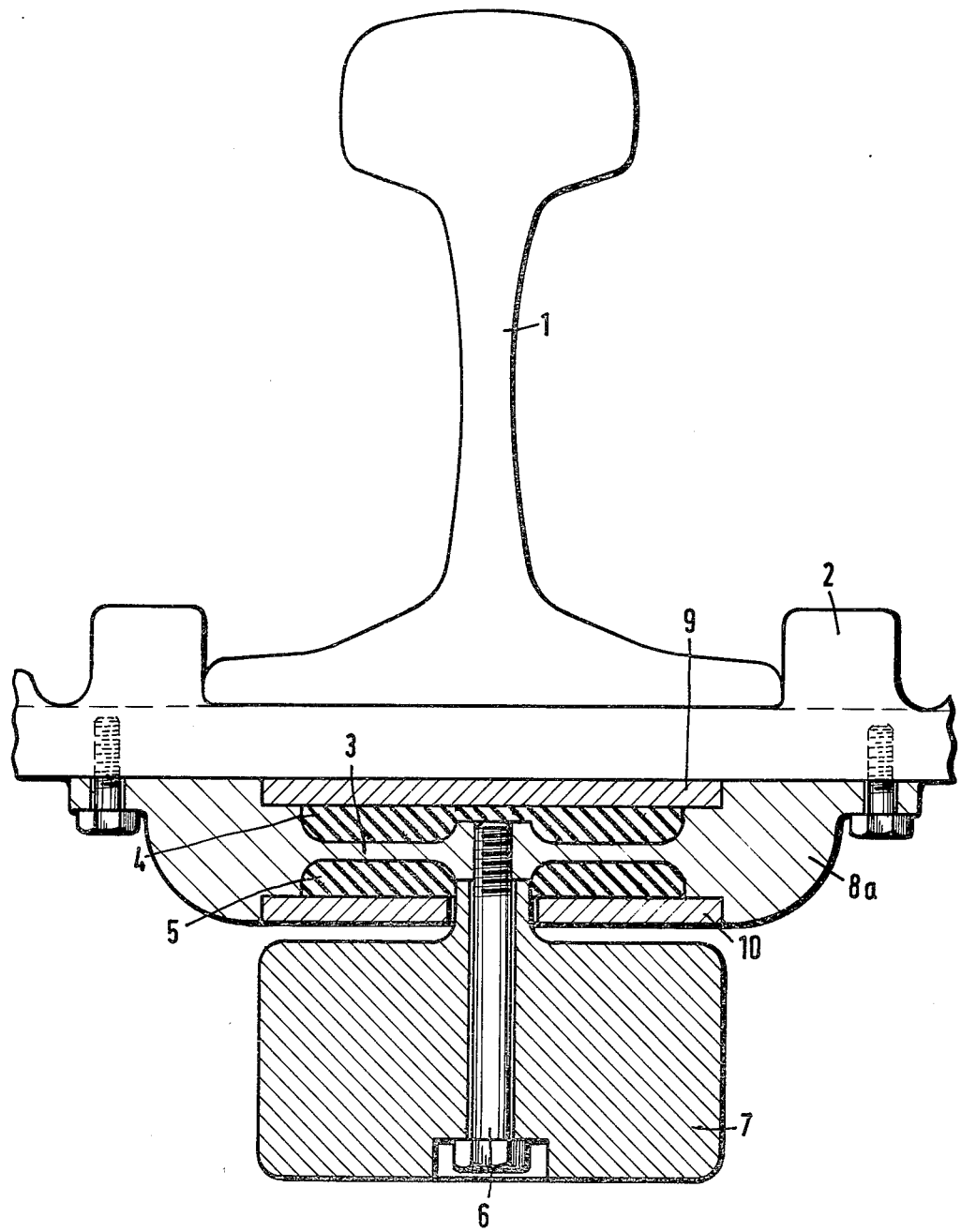
FIG. 3 is a vertical sectional view of a rail with an oscillation system according to another embodiment of the invention. The oscillation system is arranged below the rail foot in the area of the sleeper.

Referring to FIGS. 2 and 3 of the drawings, a conventional rail 1 for use by and movement therealong by rail vehicles is fixed to a railway bed or foundation. Such a foundation may be formed from a bed of broken stones or a concrete foundation. Sleepers are placed onto the foundation, and ribplates 2 (see FIG. 3) fix the rail 1 to the sleepers. As is well known, when rail 1 is traversed by the wheels of a railway vehicle, rail 1 is incited to or induced to oscillate. With a conventional rail 1 of the UIC-60 type which is normally supported on sleepers, and with the sleepers being spaced from each other a distance of 0.6 m oscillations normally occur.

Figure 1:
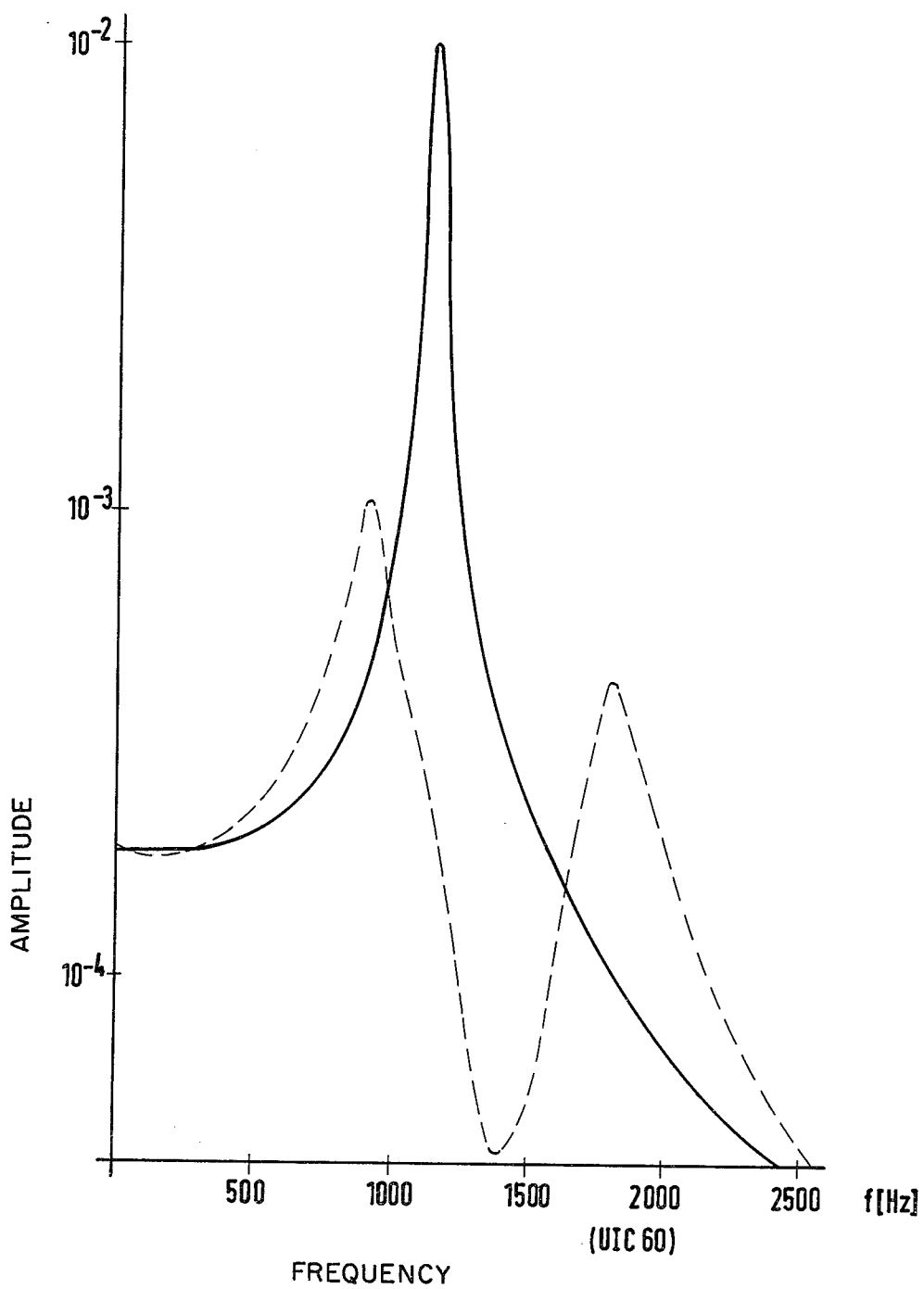
FIG. 1 is a graphical representation illustrating the amplitude of the oscillations as a function of frequency with frequency being indicated as the abscissa and the amplitude as the ordinate. The curve shown in solid outline is for a UIC-60 rail with a smooth surface and with adjacent sleepers being spaced 60 cm. The curve shown in dashed or broken outline is a graphical representation of the oscillating system of FIG. 2.

Referring now more particularly to FIG. 1 which shows a plot of the amplituide of the oscillations versus frequency. The frequency being plotted as the abscissa and the amplitude of the oscillations as the ordinate. The solid curve shows the amplitude of the oscillations for a rail with a smooth surface without the oscillating system according to the invention. The maximum amplitude occurs at a frequency of 1130 Hz. The broken or dashed line shows the amplitude of the oscillations as a function of frequency for the oscillation system of the FIG. 2 embodiment. Note, the dashed curve has two maximum amplitudes and one-tenth less than the single maximum amplitude without the use of the oscillating system according to the invention, and that at 1130 Hz, oscillations are suppressed.

With a rail without the oscillation system according to the invention, and with the rails placed onto sleepers (not shown), and with the sleepers spaced at a distance of 0.6 m, oscillations occur as a result of the incitation of the rail by the wheel running thereover. It has been shown that the maximum of these oscillations (resonance point) is about 1130 Hz. It has also been shown that these oscillations are practically independent of the type of sleeper used and independent of the foundation and of the speed of the vehicle running thereof. Thus, it has been established that the distance between ripples of a measurement stretch made by railway vehicles normally travelling at 160 km/hr. amounted to 40 mm. This space of 40 mm is the distance which the vehicle covers within an oscillation duration at an oscillating frequency of 1130 Hz. These measurement values permit the mechanism of the appearance of ripples to be explained. With a chance irregularity in the rail running surface, the rail is incited to high oscillation amplitudes with the oscillation frequency of 1130 Hz. The forces which arise are so large that plastic deformations arise in the rail running surface and at the wheel. After the incitation to oscillate, the rail then swings away from the wheel in the first oscillation phase. Thus, a relief or space occurs between the wheel and the rail. In the subsequent oscillation phase, the rail swings upwards and a high load at the point of contact between the wheel and the rail occurs so that plastic deformations appear on the rail and the wheel. While the plastic markings on the wheel soon subside by natural abrasion, the markings on the rail running surface increase and are strengthened by the repeated phased loads of the following wheels so that gradually the ripples arise. It was established that the acceleration or oscillation of the rail, and therewith also the load, increase manifoldly as soon as ripples have been formed on the rail surface.

As shown in FIG. 1 in dashed lines, the frequency of 1130 Hz of the oscillating system is suppressed and two new secondary maxima arise. The absolute values of which are smaller, however, at least by factor 10. The new curve applies for the oscillating system according to FIG. 2 with a mass of 6 kg, a spring constant of $2.8 \times 10^8$ N/m and a dampening constant of 4920 Ns/m.

Referring now more particularly to FIG. 2, the oscillating system is arranged below the foot of rail 1 between sleepers (not shown in FIG. 2, but shown in FIG. 4). The oscillating system is composed of a saucer spring 3 sandwiched between a pair of dampeners formed of hard rubber bodies 4,5 having inner friction, a mass 7 secured to the center of saucer spring 3 by means of a screw bolt 6. A securing element 8 is provided for clampingly engaging the lateral edges of the rail foot. The securing element 8 is connected with the saucer spring 3 at the edges thereof. Chambers are provided to receive the hard rubber bodies 4 and 5. These chambers are formed from the saucer spring 3, securing element 8 and oppositely disposed caps 9 and 10 embedded in the securing element 8. The hard rubber bodies 4 and 5 are under initial stress and embedded in the chambers which are sealed on all sides. The hard rubber bodies are disposed on opposite sides of the saucer spring for clamping thereof.

Referring now more particularly to FIG. 3 in which the same reference numerals are used for the same parts, a modified securing element 8a is shown. Securing element 8a is provided to attach the oscillating system in the area of the sleepers (not shown in FIG. 3, but shown in FIG. 4). As noted heretofore, with respect to FIG. 2, the oscillating system of FIG. 2 is arranged between the sleepers. Securing element 8a is attached to the underside of rib plate 2 which supports rail 1. The coupling to rail 1 is ensured against raising from the rib plate 2 by the usual coupling means, not shown.

Figure 4:
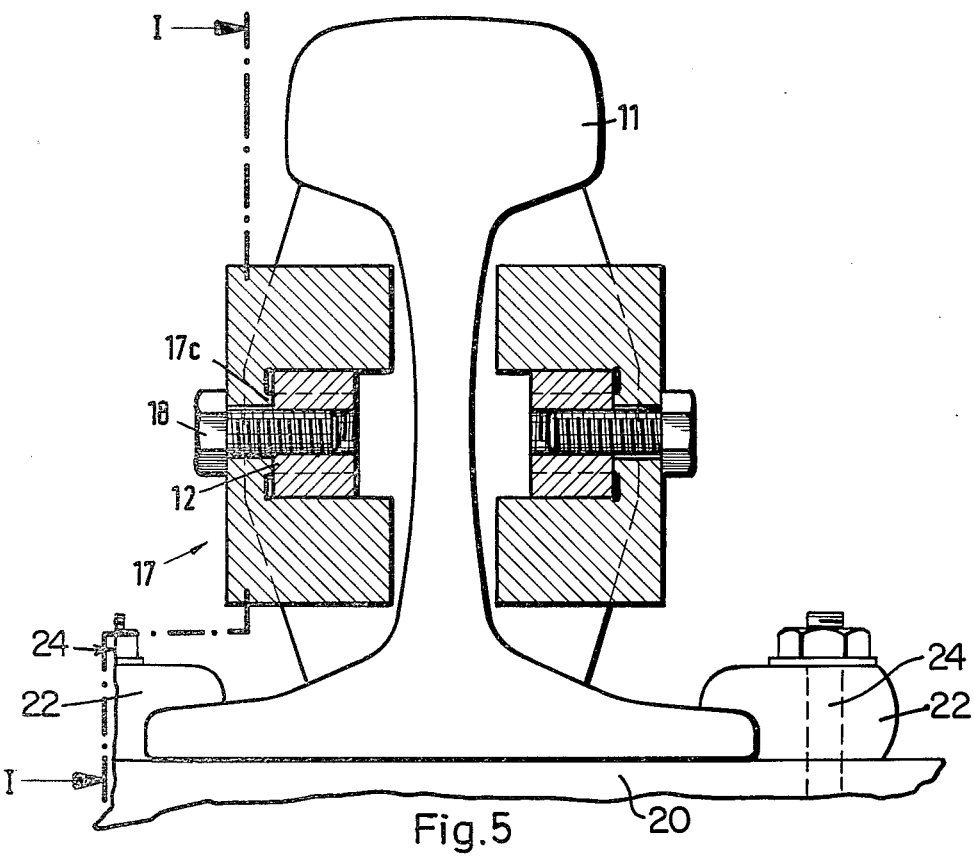
FIG. 4 is a vertical sectional view of a rail taken on line II—II of FIG. 5, according to another embodiment of the invention. The oscillation system is arranged so that it is positioned on both sides of the rail stem.
Figure 5:
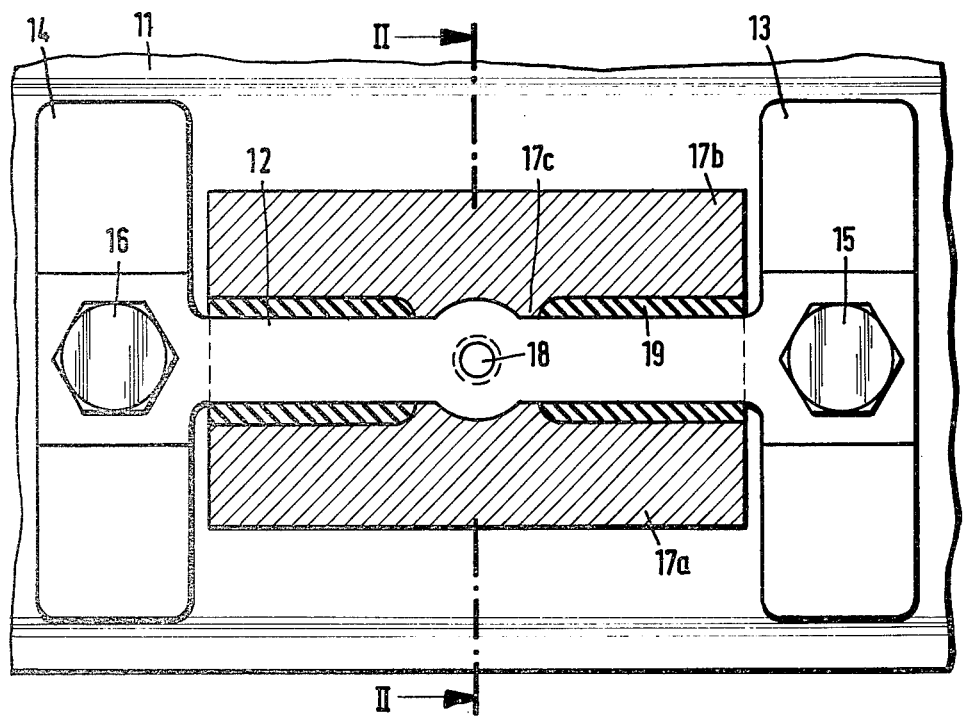
FIG. 5 is a lateral view of the rail and oscillation system taken on line I—I of FIG. 4.

Referring now more particularly to FIGS. 4 and 5, which shows an oscillating system suitable for coupling to the stem of rail 11 and has the same structure. Rail 11 is carried by a sleeper 20 and coupled thereto by any appropriate means such as the usual coupling bracket 22 and bolt-nut combination 24 which connects bracket 22 to sleeper 20.

The rail stem coupled oscillating system is particularly suited when the oscillating system is to extend continuously in longitudinal direction of the rail. This oscillating system, however, can of course also be composed of individual systems which are then spaced from one another on the rail.

The system of FIGS. 4 and 5 also includes a spring, dampeners and masses. The system is composed of a transverse beam spring 12 extending in a longitudinal direction of rail 11 and secured at both ends to the rail stem by means of bridge elements 13,14. The elements 13,14 support each other as a bridge with screwbolts 15,16 penetrating the elements 13,14. Screwbolts 15,16 can either be directly secured to the rail stem or penetrate the rail stem and at the same time secure the opposing bridge-like elements. A mass 17 is secured in the center of the transverse beam spring 12 by means of a screwbolt 18. The mass 17 is composed of two elongated ashlar-type blocks 17a,17b which are divided up and arranged on both sides of the transverse beam spring 12 and are connected to each other in the center by a stem 17c. The transverse beam spring 12 is secured to this stem 17c by means of the screwbolt 18. Hard rubber blocks 19 are clamped in the gaps provided between the ashlar-type blocks 17a,17b of the mass 17 and the transverse beam spring 12. These hard rubber blocks 19 serve as the dampeners.

As already set forth, the additional mass, the spring constant and the dampening constant can be determined by simple tests. In addition, according to the oscillation teaching, these can be determined by computation calculation for a specific rail system. For example, for a rail of the UIC-60 type having a distance between sleepers of 0.6 m, and with an oscillating system according to FIG. 2 inserted between each sleeper, the oscillating system has a mass of 4 to 8 kg, a spring constant of 2 to $3 \times 10^8$ N/m and a dampening constant of 4 to $6 \times 10^3$ Ns/m.

While there is shown and described what is considered to be the preferred embodiments of the invention, it will be obvious that various changes and modifications may be made therein without departing from the scope of the invention.

We claim:

1. In a system for dampening the oscillations of a rail, in which said rail is supported on a railway bed, said rail being incited to oscillate by a wheel running over said rail, and including masses attached to said rail distributed over the length thereof to dampen said oscillations, the improvement comprising:
   an oscillating system coupled to said rail,
   said rail having a characteristic frequency, and
   said oscillating system being tuned to the characteristic frequency of said rail and including a mass, spring means and dampeners
   said spring means connected at the ends thereof to said rail and at a location between said ends to said mass, said spring means including means for receiving said dampeners.

2. In the system as set forth in claim 1, wherein the oscillating system is tuned to the characteritic frequency of the rail at which the amplitude of vertical oscillations is a maximum.

3. In the system as set forth in claim 1, wherein the oscillating system is tuned to the characteristic frequency of the rail at which the inciting forces are at their maximum and arising secondary maxima are outside of the characteristic frequency and at frequencies at which the inciting forces are at their minimum.

4. In the system according to claim 1, including a plurality of said oscillating systems coupled to said rail, said oscillating systems being spaced from each other along said rail.

5. In the system as claimed in claim 4, wherein said oscillating systems are uniformly distributed along said rail, at sleepers.

6. In the system as claimed in claim 4, wherein said oscillating systems are uniformly distributed along said rail and positioned between sleepers.

7. In the system as claimed in claim 1, wherein said oscillating system extends continuously in the longitudinal direction of said rail.

8. In the system as claimed in claim 1, wherein said mass is coupled to said rail under the foot thereof.

9. In the system as claimed in claim 8, wherein said spring means is a saucer spring.

10. In the system as claimed in claim 9, wherein said dampeners are formed of hard rubber having inner friction.

11. In the system as claimed in claim 9, wherein said means for receiving said dampeners comprise chambers formed by said saucer spring, said system further including oppositely disposed caps covering said chambers and enclosing said dampeners to maintain said dampeners under initial stress.

12. In the system as claimed in claim 1, including a securing element for securing said masses in the area of sleepers for said rail.

13. In the system as claimed in claim 12, wherein said spring means is a saucer spring connected with said securing element, said means for receiving said dampeners comprise chambers formed by said saucer spring, said mass being connected with said securing element through said saucer spring and said dampeners, and means sealing said chambers on all sides.

14. In the system as claimed in claim 13, wherein the weight of said mass is between 4 to 8 kg., said spring means has a constant between 2 to $3 \times 10^8$ N/m, and said dampeners have a constant in the range of 4 to $6 \times 10^3$ Ns/m.

15. In the system as claimed in claim 1, wherein said mass is coupled to the stem of said rail on both sides thereof.

16. In the system as claimed in claim 15, wherein said spring means is a transverse beam spring, said transverse beam spring coupling said mass to said stem, and said dampeners include hard rubber blocks clamped between said beam spring and said mass.

17. In the system as claimed in claim 1, wherein
said dampeners are formed of hard rubber having inner friction,
said spring means is a saucer spring sandwiched between a pair of said dampeners, and including
a screw bolt coupling said mass to said rail under the foot thereof and through the center of said saucer spring, and
a securing element connected with said saucer spring clampingly engaging the lateral edges of said rail foot.

18. In the system as claimed in claim 17, wherein
said means for receiving said dampeners comprise chambers formed by said saucer spring together with said securing element forming chambers for receiving said dampeners, said chambers being on opposite sides of said saucer spring;
said dampeners are embedded within said chambers under initial stress, and including
oppositely disposed cap means sealing said chambers with said dampeners therein maintained under initial stress.

19. In the system as claimed in claim 1, wherein
said dampeners are formed of hard rubber having inner friction,
said spring means is a saucer spring sandwiched between a pair of said dampeners, and including
a securing element connected with said saucer spring at the edges thereof for attachment to said rail by means of a rib plate which supports said rail, said means for receiving said dampeners formed by said securing element together with said saucer spring comprising chambers,
said dampeners being embedded within said chambers under initial stress,
oppositely disposed caps sealingly covering said chambers and enclosing said dampeners for maintenance thereof under said initial stress, and
a screw bolt coupling said mass to said saucer spring through the center thereof.

* * * * *